Patented May 27, 1930

1,760,771

UNITED STATES PATENT OFFICE

JEAN PAISSEAU, OF PARIS, FRANCE

PROCESS FOR PURIFYING PEARL ESSENCE

No Drawing. Application filed February 9, 1925, Serial No. 8,053, and in France October 3, 1924.

In current practice, pearl essence is purified by repeated washings with an antiseptic water which is generally ammoniacal water.

The brilliant particles in the state of emulsion in the liquid will settle very slowly when the recipients are allowed to stand, and a portion of the impurities will remain in suspension in the liquid, so that the latter need only be poured off; this operation is continued until the liquid becomes clear.

But this method requires a long time as well as a cumbersome outfit, and it is also attended with some risk, for in warm weather the products are subject to fermentations by which the pearl essence will be destroyed. In other cases the method is ineffective, for instance when the impurities consist of mud or sludge, or even of rust in a finely divided state, which settle at the same rate as the pearl essence.

My invention relates to a purifying process by which the above-mentioned inconveniences may be obviated and an absolutely pure pearl essence may be obtained within a few minutes.

The said process is based upon the fact that the crystalloids forming pearl essence, which are hardly moistened by water, have on the contrary a great affinity for numerous substances which are not miscible with water (or scarcely so), whereas the organic or inorganic impurities in the pearl essence will form a sludge which readily absorbs water. In this manner, by agitating an aqueous emulsion of pearl essence with a certain quantity of amyl acetate, for example, it is found that the crystalloids will pass into the amyl acetate while the impurities remain in the water, and when allowed to stand there will be formed two layers of liquid, i. e. a layer of water which is more or less cloudy and contains the impurities, and a layer of amyl acetate containing the brilliant particles of the pearl essence.

Other bodies will act in the same manner as amyl acetate. These belong to the class of bodies which are not miscible with water, such as fatty substances, hydrocarbons of the aromatic series, petroleum and gasoline, chlorine compounds, ether, carbon disulphide and the like.

However, the above-mentioned operating method is difficult to carry out in practice, at least on a manufacturing scale, since the liquid when added to the water will often form a permanent emulsion which renders the separation difficult and the washing incomplete.

A more regular and reliable method consists in employing a pearl essence in the pasty condition, this being obtained by settling and by a centrifugal treatment. I incorporate into this paste by the proper mixing, a sufficient quantity of the selected substance, for instance amyl acetate; this will afford an emulsion resembling a stiff cream, and it then becomes dissociated by the separation of the water which draws with it the impurities; the purified pearl essence thus remains incorporated with the amyl acetate. But even this method will fail in certain cases, and the water may not always separate from the emulsion, this being due to an excessive fluidity of the amyl acetate and of the paste which it forms with the pearl essence.

It is easy to remedy this inconvenience by increasing the consistency of the liquid chosen for the preparation of the paste of essence of pearls. The process is thus improved and becomes absolutely certain. In the case of amyl acetate, to mention only this example, it is replaced by a collodion obtained by dissolving nitrocellulose in this solvent. The crystalloids of essence of pearls have the same affinity for this collodion as for pure amyl acetate and after elimination of the water, they form with the same a thickened paste easy to manipulate.

In practice, for carrying out this process, in a receptacle of any kind, cup, bowl or the like, is placed a known quantity (500 grams for instance) of essence of pearls in the form of an aqueous paste, obtained by centrifugation or otherwise. According to the water content of this paste of essence of pearls, 250 to 500 grams of an amyl acetate collodion containing from 8 to 14% of nitrocellulose are added thereto.

The mixing is effected by means of a spatula, or of any other suitable means. It is noticed that the essence of pearls is very rapidly incorporated and that a homogeneous and shiny paste is thus obtained; but very soon, small drops of soiled water ooze from this paste which dissociates and resolves into small lumps in proportion as the stirring is continued. In this condition, the paste exactly resembles butter at the beginning of its formation in the churn.

The water loaded with impurities is eliminated by passage through a sieve for instance. The granular paste is again placed in the vessel, bowl etc. with a suitable quantity of clean ammoniacal water. Stirring is resumed and continued, which again drives away impurities, and the operation is repeated until the water issues in a sufficiently clean condition. In fact, the same steps are taken as in the operation consisting in washing butter in order to free it from the whey it still contains.

This treatment has for effect to transform again the essence incorporated with the collodion into a thickened paste of essence of pearls, which is practically dehydrated and miscible without difficulty with lacquers and cellulose varnishes.

Considering the resemblance between the various conditions of this paste of essence of pearls and the various conditions of butter in the course of its manufacture, the special apparatus used in the butter industry gives satisfactory results for the industrial preparation of essence of pearls in substantial quantites.

For the amyl acetate collodion I may substitute a collodion consisting of acetate of cellulose dissolved in tetrachlorethane, and in a general manner all varnishes, pastes and the like whose solvent is not miscible with water. The success of the operation depends solely upon the consistency and the viscosity of the product in use and upon the affinity which the crystalloids of the pearl essence have for the said product.

It is ascertained that the pearl essence which is thus incorporated with a varnish whose solvent is not miscible with water is protected to a certain degree against the destructive action which is exercised upon the said essence by certain chemical products of a reducing or an oxidizing character which are in current use in the bleaching process.

For this reason it is feasible to terminate the washing of the paste obtained by the last-mentioned process, by the use of a washing solution of sodium bisulphite, sulfur dioxide, oxalic acid or like reducing agent, or otherwise by the use of permanganates, hypochlorites or like oxidizing agents, and in this manner I am enabled to obtain a refined pearl essence having a perfectly white color.

Having thus described my process, what I claim as new therein, and my own invention, is:

1. A process for purifying pearl essence which consists in agitating pearl essence in a prepared and purified aqueous suspension, in bringing the pearl essence to the state of an aqueous paste, in adding to the said paste in small quantities and while mixing a liquid which is not miscible with water, capable of moistening the particles of pearl essence and of forming with the same a new paste the muddy water of which separates spontaneously, and in washing this new paste by mixing the same with water until the latter after having carried along the impurities contained in this paste flows out in a pure state.

2. A process for purifying pearl essence consisting in agitating pearl essence in a prepared and purified aqueous suspension, in bringing the pearl essence to the state of an aqueous paste, in adding to this paste a varnish the solvent of which is not miscible with water, this addition being made in sufficiently small quantities so that the emulsion resulting from the mixture of the said paste and of the said varnish can be spontaneously destroyed in liberating the pure water originally incorporated with the paste of pearl essence, the said paste being subsequently washed with water.

3. A process for purifying pearl essence consisting in agitating pearl essence in a prepared and purified aqueous suspension, in adding to this paste a varnish the solvent of which is not miscible with water, this addition being made in sufficiently small quantities so that the emulsion resulting from the mixture of the said aqueous paste and of the said varnish can be spontaneously destroyed in liberating the pure water originally incorporated with the paste of pearl essence, the said paste being then washed with water and in bleaching the said paste by means of a reducing product which does not attack the crystals of pearl essence.

In testimony whereof I have hereunto affixed my signature.

JEAN PAISSEAU.